(12) United States Patent
Hoffman et al.

(10) Patent No.: US 7,261,790 B2
(45) Date of Patent: *Aug. 28, 2007

(54) MASTER PROCESSING APPARATUS

(75) Inventors: Ronald J. Hoffman, Phoenix, AZ (US); Aaron M. Castiglione, Tempe, AZ (US); Paul J Lemens, Scottsdale, AZ (US)

(73) Assignee: Xyron Inc., Scottsdale, AZ (US)

( * ) Notice: Subject to any disclaimer, the term of this patent is extended or adjusted under 35 U.S.C. 154(b) by 382 days.

This patent is subject to a terminal disclaimer.

(21) Appl. No.: 10/259,709

(22) Filed: Sep. 30, 2002

(65) Prior Publication Data

US 2005/0098267 A1    May 12, 2005

Related U.S. Application Data

(63) Continuation-in-part of application No. 09/987,484, filed on Nov. 14, 2001, now Pat. No. 6,698,487.

(60) Provisional application No. 60/248,217, filed on Nov. 15, 2000.

(51) Int. Cl.
*B32B 37/00* (2006.01)

(52) U.S. Cl. .................. 156/234; 156/238; 156/555; 156/582

(58) Field of Classification Search ........... 156/555, 156/580, 582, 583.1, 538, 539, 540, 541, 156/542, 552, 234, 238, 230; 100/155 R, 100/160, 176, 327
See application file for complete search history.

(56) References Cited

U.S. PATENT DOCUMENTS

| | | | |
|---|---|---|---|
| 2,507,683 A | 5/1950 | Smith | |
| 2,647,299 A | 8/1953 | Thomas | |
| 2,975,824 A | 3/1961 | Schenkengel | |
| 2,977,271 A | 3/1961 | Lutwack | |
| 2,991,214 A | 7/1961 | Burkholder | |
| 3,027,285 A | 3/1962 | Eisner et al. | |
| 3,301,117 A | 1/1967 | Spaulding | |
| 3,309,983 A | 3/1967 | Dresser | |
| 3,367,225 A | 2/1968 | Stanford et al. | |
| 3,453,169 A | 7/1969 | Buck et al. | |

(Continued)

FOREIGN PATENT DOCUMENTS

CA          550377          12/1957

(Continued)

OTHER PUBLICATIONS

Supplemental European Search Report for Application No. 01 996 460.0 dated Jan. 20, 2005.

(Continued)

*Primary Examiner*—James Sells
(74) *Attorney, Agent, or Firm*—Pillsbury Winthrop Shaw Pittman LLP

(57) ABSTRACT

A removable cartridge assembly for a master processing apparatus includes a cartridge body and a pair of feed roll assemblies. Each feed roll assembly includes a stock material wound about a core and mounting members on the ends of the core. Feed roll mounting structures removably secure the feed roll assemblies on the cartridge body so that, for example, a feed roll assembly from which the supply of stock material has been exhausted can be removed and replaced.

83 Claims, 9 Drawing Sheets

U.S. PATENT DOCUMENTS

| | | |
|---|---|---|
| 3,533,886 A | 10/1970 | Staats et al. |
| 3,737,359 A | 6/1973 | Levitan |
| 3,756,897 A | 9/1973 | Shields et al. |
| 3,840,420 A | 10/1974 | Sarcia |
| 3,901,758 A | 8/1975 | Humphries |
| 3,944,455 A | 3/1976 | French |
| 3,962,021 A | 6/1976 | Weisfeld |
| 3,974,552 A | 8/1976 | Minogue et al. |
| 4,016,021 A | 4/1977 | La Fleur |
| 4,021,288 A | 5/1977 | Hannon et al. |
| 4,060,441 A | 11/1977 | Ohta et al. |
| 4,151,900 A | 5/1979 | Kirwan |
| 4,199,202 A | 4/1980 | Maeda |
| 4,226,664 A | 10/1980 | Shaffer |
| 4,264,400 A | 4/1981 | Breitmar |
| 4,336,096 A | 6/1982 | Dedekind |
| 4,351,690 A | 9/1982 | George |
| 4,377,434 A | 3/1983 | Del Bianco et al. |
| 4,387,000 A | 6/1983 | Tancredi |
| 4,619,728 A | 10/1986 | Brink |
| 4,743,325 A | 5/1988 | Miyake |
| 4,758,952 A | 7/1988 | Harris, Jr. et al. |
| 4,840,698 A | 6/1989 | Kuehnert |
| 4,859,274 A | 8/1989 | Marvel |
| 4,921,556 A | 5/1990 | Hakiel et al. |
| 5,053,099 A | 10/1991 | Seki et al. |
| 5,098,759 A | 3/1992 | Felix |
| 5,102,491 A | 4/1992 | Correa et al. |
| 5,133,828 A | 7/1992 | Jacques |
| 5,163,349 A | 11/1992 | Takagi et al. |
| 5,279,697 A | 1/1994 | Peterson et al. |
| 5,292,388 A | 3/1994 | Candore |
| 5,295,753 A | 3/1994 | Godo et al. |
| 5,322,001 A | 6/1994 | Boda |
| 5,334,431 A | 8/1994 | Longtin |
| 5,368,677 A | 11/1994 | Ueda et al. |
| 5,435,882 A | 7/1995 | Azamar et al. |
| 5,445,700 A | 8/1995 | Uang |
| 5,480,509 A | 1/1996 | Matsuo et al. |
| 5,501,415 A | 3/1996 | Harris et al. |
| 5,571,368 A | 11/1996 | Barge |
| 5,580,417 A | 12/1996 | Bradshaw |
| 5,582,669 A | 12/1996 | Gove et al. |
| 5,584,962 A | 12/1996 | Bradshaw et al. |
| 5,639,339 A | 6/1997 | Couillard |
| 5,669,717 A | 9/1997 | Kostrzewsky |
| 5,718,799 A | 2/1998 | Colson et al. |
| 5,735,997 A | 4/1998 | Reinders |
| 5,735,998 A | 4/1998 | Bradshaw |
| 5,783,024 A | 7/1998 | Forkert |
| 5,788,796 A | 8/1998 | Look et al. |
| 5,788,806 A | 8/1998 | Bradshaw et al. |
| 5,804,032 A | 9/1998 | Reinders |
| 5,810,967 A | 9/1998 | Couillard et al. |
| 5,853,531 A | 12/1998 | Murphy et al. |
| 5,888,342 A | 3/1999 | Reinders |
| RE36,198 E | 4/1999 | Couillard et al. |
| 5,919,333 A | 7/1999 | Maltby et al. |
| 5,961,779 A | 10/1999 | Bradshaw |
| 5,985,088 A | 11/1999 | Couillard et al. |
| 6,059,003 A | 5/2000 | Wittkopf |
| 6,149,752 A | 11/2000 | Matthews et al. |
| 6,159,327 A | 12/2000 | Forkert |
| 6,244,322 B1 | 6/2001 | Paque |
| 6,270,612 B1 | 8/2001 | Bradshaw |
| RE37,345 E | 9/2001 | Bradshaw et al. |
| 6,294,033 B1 | 9/2001 | Fukuoka et al. |
| 6,315,020 B1 | 11/2001 | Seki |
| 6,368,449 B1 | 4/2002 | Bradshaw et al. |
| 6,422,281 B1 * | 7/2002 | Ensign, Jr. et al. ......... 156/495 |
| 6,427,744 B2 | 8/2002 | Seki et al. |
| 6,431,243 B1 | 8/2002 | Ito et al. |
| 6,431,244 B1 | 8/2002 | Moriguchi et al. |
| 6,523,592 B2 | 2/2003 | Kuki |
| 6,527,028 B2 * | 3/2003 | Miller ........................ 156/555 |
| 6,550,516 B2 | 4/2003 | Moriguchi et al. |
| 6,578,618 B2 | 6/2003 | Muraki et al. |
| 6,602,376 B1 * | 8/2003 | Bradshaw .................. 156/234 |
| 2001/0004922 A1 | 6/2001 | Seki et al. |
| 2001/0006202 A1 | 7/2001 | Inana et al. |
| 2002/0179222 A1 | 12/2002 | Velasquez et al. |
| 2003/0010170 A1 | 1/2003 | Lemens et al. |
| 2003/0010456 A1 | 1/2003 | Lemens et al. |
| 2003/0209331 A1 | 11/2003 | Worth |
| 2003/0234082 A1 | 12/2003 | Casaldi et al. |

FOREIGN PATENT DOCUMENTS

| | | |
|---|---|---|
| EP | 0 237 924 A2 | 3/1987 |
| EP | 0 291 178 | 1/1988 |
| GB | 2 199 010 | 6/1988 |
| GB | 2 250 013 A | 5/1992 |
| JP | 60-40272 | 10/1995 |
| JP | 11-245296 | 9/1999 |
| JP | 11-245297 | 9/1999 |
| JP | 11-245299 | 9/1999 |
| JP | 11-254528 | 9/1999 |
| JP | 11-278416 | 10/1999 |
| JP | 2000-37775 | 2/2000 |
| JP | 2000-103026 | 4/2000 |
| JP | 2000-168020 | 6/2000 |
| JP | 2000-263644 | 9/2000 |
| JP | 2000-272005 | 10/2000 |
| JP | 2001-076643 | 3/2001 |
| JP | 2001-079940 | 3/2001 |
| JP | 2001-079941 | 3/2001 |
| JP | 2001-079942 | 3/2001 |
| JP | 2001-079946 | 3/2001 |
| JP | 2001-096617 | 4/2001 |
| JP | 2001-096619 | 4/2001 |
| JP | 2001-277357 | 10/2001 |
| WO | WO99/24257 | 5/1999 |
| WO | WO02/40271 | 5/2002 |

OTHER PUBLICATIONS

Examination Report for Application No. 01 996 460.0 dated Dec. 15, 2004.

* cited by examiner

MASTER PROCESSING APPARATUS

This application is a continuation-in-part of and claims priority to U.S. Appln. of Lemens et al., Ser. No. 09/987,484, filed Nov. 14, 2001, U.S. Pat No. 6,698,487 the entirety of which is incorporated into the present application, which in turn claims priority to U.S. Provisional Appln. of Lemens et al., Ser. No. 60/248,217, filed Nov. 15, 2000, the entirety of which is hereby incorporated into the present application by reference.

FIELD OF THE INVENTION

The present invention is generally related to master processing apparatuses for performing master processing operations on selected substrates.

BACKGROUND OF THE INVENTION

Master processing apparatuses, such as laminating apparatuses and adhesive transfer apparatuses, are known in the art. Master processing apparatuses operate to apply one or more sheets of a stock material to a master (or substrate). Each master processing apparatus includes a master processing assembly and a pair of feed rolls which hold the supply of stock materials. During a master processing operation, the stock materials are unwound from the feed rolls and are driven together with the master through the master processing assembly.

A master processing apparatus typically includes a frame on which the pair of feed rolls are mounted. "Feed roll" is a generic name which may refer to a roll of a film (such as a clear laminating material), to a roll of masters or to a roll of backing material that carries an adhesive. "Stock material" is a generic name for the sheet of material that is wound around the roll. The feed rolls are often mounted in a cartridge which is itself mounted on the frame. A master processing assembly is provided in the frame and the stock materials on the feed rolls are unwound and fed into the master processing assembly. An actuator may be included in the apparatus to operate the master processing assembly. For example, a power-operated or, alternatively, a hand-operated actuator may be included in the apparatus to actuate the master processing assembly. A master to be processed is fed into the master processing assembly and the master processing assembly causes adhesive from one or both the stock materials to adhere to the master.

In laminating operations, for example, both stock materials are laminating films that are coated with pressure-sensitive or heat-sensitive adhesive and these films are applied to opposing sides of the master and adhere to the master or to each other (if the films are larger than the master). In adhesive transfer operations, one of the stock materials is a release liner on which a layer of adhesive is coated and the other is an aggressive or non-aggressive mask. During the operation, the adhesive on the release liner is transferred to one side of the master and, if the mask substrate is aggressive (i.e. has an affinity for adhesive bonding), then any excess adhesive will transfer to the mask substrate, which is then peeled off to expose the master on the release liner and remove the excess adhesive. For further details on these operations, reference may be made to U.S. Pat. Nos. 5,580,417 and 5,584,962, each of which is incorporated herein by reference in its entirety.

The present application endeavors to provide an improved architecture for mounting feed rolls in this master processing apparatus.

SUMMARY OF THE INVENTION

One aspect of the present invention provides a feed roll assembly for use in a master processing apparatus. The feed roll assembly has a core and a supply of stock wound about the core. A pair of flanges extend radially from the opposing ends of the core. The flanges are configured to be received in flange receiving recesses of a feed roll mounting system to rotatably mount the core for unwinding of the stock material.

Other aspects of the invention relate to a feed roll set, a combination including a master processing apparatus and a feed roll set, and methods of mounting a feed roll and/or processing a master.

DETAILED DESCRIPTION OF THE INVENTION

Figure 1:
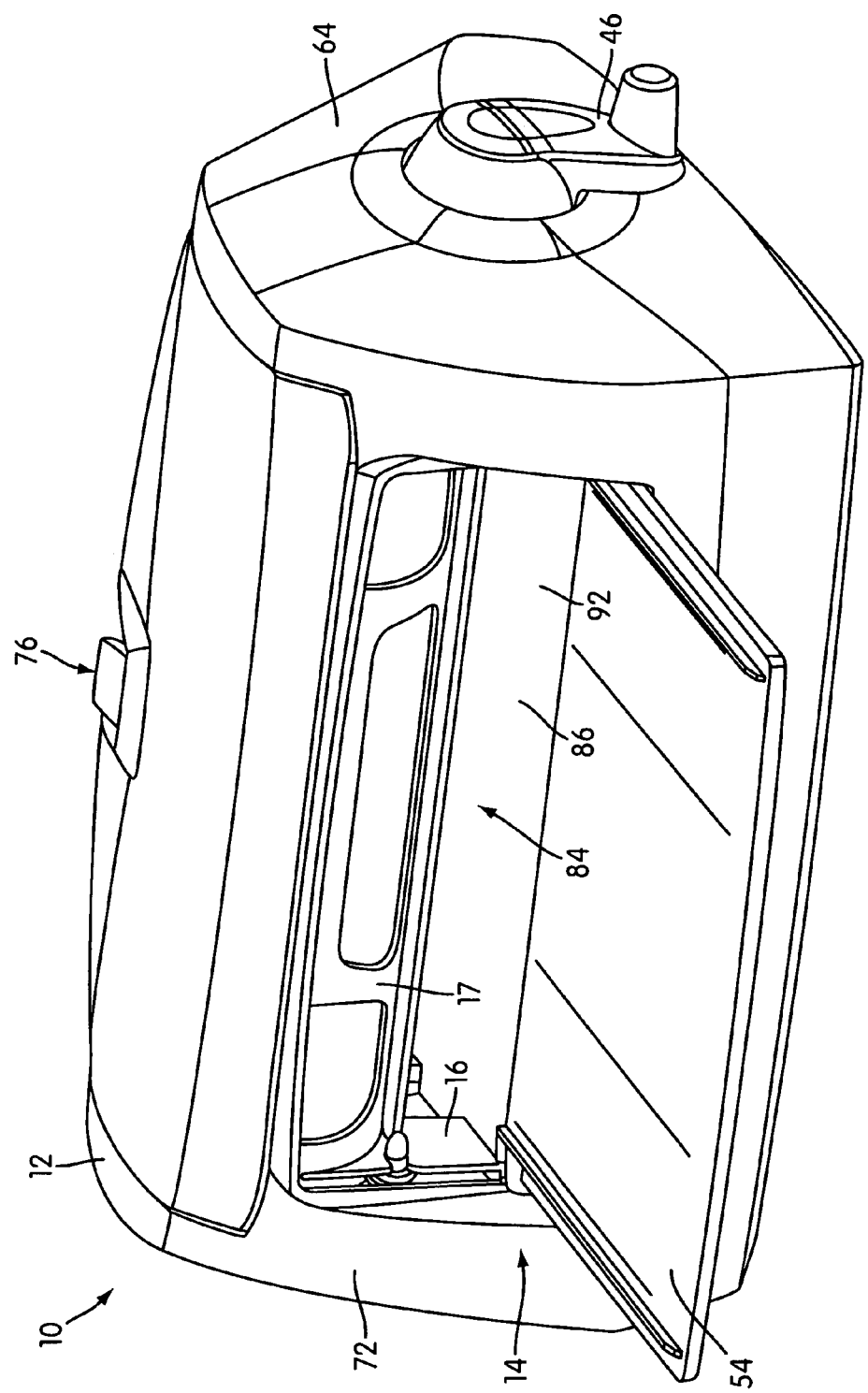
FIG. 1 is a perspective view of a feed side of a master processing apparatus.
Figure 2:
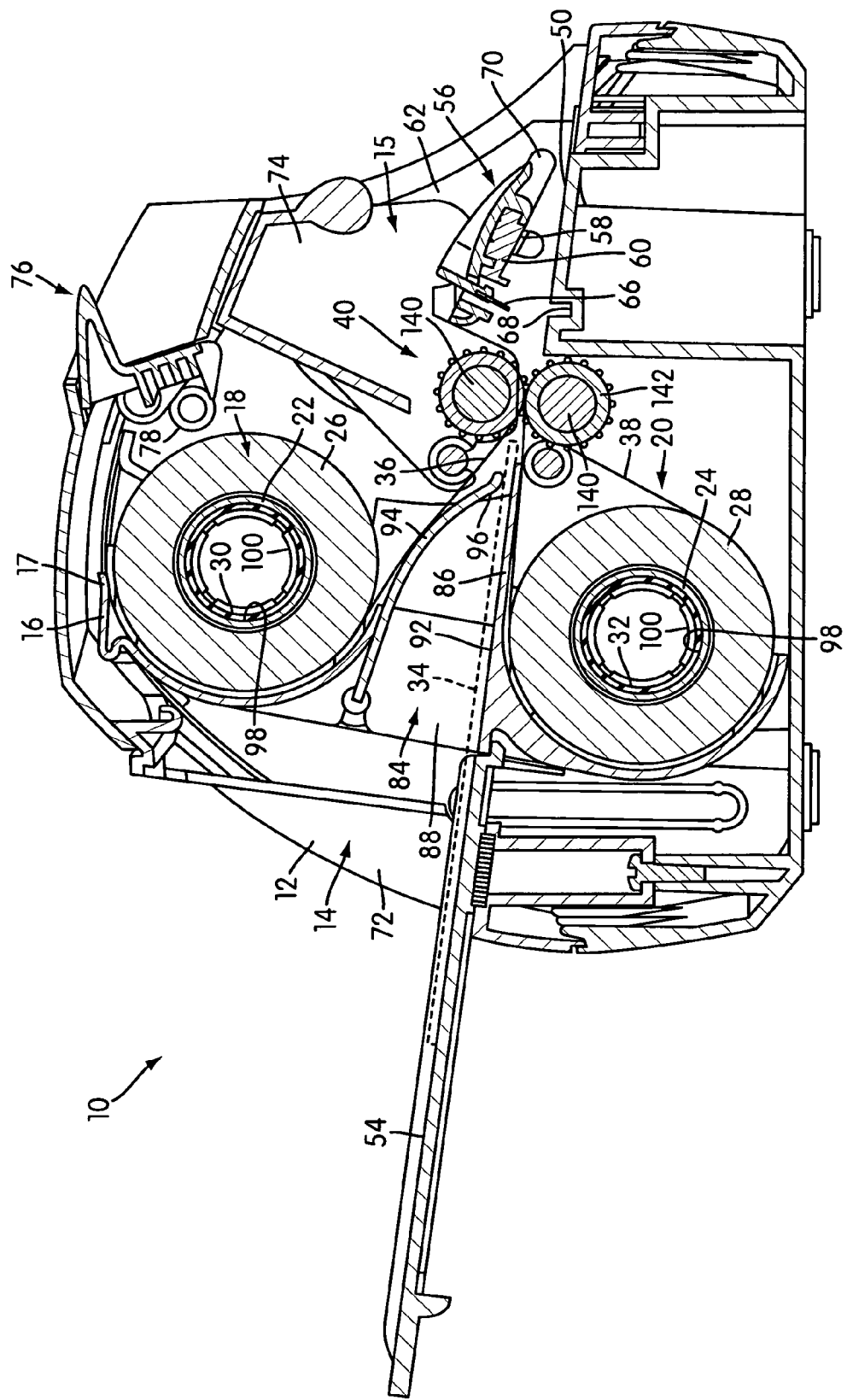
FIG. 2 is a cross-sectional view as taken along line 2-2 in FIG. 1.

FIGS. 1 and 2 show a master processing apparatus, generally designated 10. As explained below, the master processing apparatus 10 is constructed for use with a pair of feed roll assemblies that are removably mounted on a cartridge body of a cartridge assembly. The feed roll assemblies are mounted in the apparatus by removably mounting the cartridge body to a frame of the master processing apparatus 10. Each feed roll assembly includes a supply of stock material that is wound around a central core. The apparatus functions to apply the stock materials to a master during a master processing operation.

The feed roll assemblies can supply a wide range of stock materials. The stock materials can be, for example, a pair of transparent laminating films that are applied to opposing sides of a document, photograph or other master to be protected. In certain aspects of the invention, the stock materials may be designed for adhesive transfer with one of the stock materials being a release liner coated with a pressure-sensitive adhesive and the other stock material being an adhesive mask substrate (see U.S. Pat. Nos. 5,580, 417, 5,584,962, 6,270,612 and 6,244,322 and U.S. Appln. of Ensign, Jr., Ser. No. 09/564,587, filed May 5, 2000) U.S. Pat. No. 6,422,281. Other variations of master processing operations may be performed with the apparatus 10. For example, the stock materials may include a magnetized substrate and an aggressive or non-aggressive adhesive mask (U.S. Appln. of Neuburger, Ser. No. 09/827,943, filed Apr. 9, 2000 now abandoned). In each case, at least one of the stock materials has adhesive thereon which provides adhesive bonding between one or both of the stock materials and the master therebetween. All the patents and patent applications mentioned hereinabove are hereby incorporated into the present application by reference.

Regardless of the specific type of application to apparatus is used for, the apparatus 10 is operable to unwind the supply of stock material on each roll and apply the stock material to respective sides of the master. The principles of the construction and use of a removable cartridge assembly having a plurality of removable and replaceable feed roll assemblies thereon are illustrated using an apparatus that applies a pair of transparent laminating films to a master, but this is an example only and not intended to limit the scope of the invention.

The structure of the example master processing apparatus 10 can be understood with reference to FIGS. 1 and 2. The master processing apparatus 10 includes a frame 12 that has a feed opening 14 on one side and an exit or discharge opening 15 (see FIG. 2) on the opposite side. The internal structure of the master processing apparatus 10 can be understood from the cross section of FIG. 2. A feed roll mounting system in the form of a cartridge assembly 16 is removably mounted to the frame 12. The cartridge assembly includes a cartridge body 17 and a pair of feed roll assemblies 18, 20 removably mounted thereon. The cartridge body 17 is constructed and arranged to be removably mounted to the frame 12 of the apparatus 10. The example cartridge body 17 is constructed of a molded plastic material.

Each of the first and second feed roll assemblies 18, 20, respectively, is comprised of a central core 22, 24, respectively, a supply of a stock material 26, 28, respectively, wound around the respective central core 22, 24 and a pair of feed roll mounting members 30, 32, respectively. The feed roll mounting members 30 of the feed roll assembly 18 are identical to one another in the example apparatus and the feed roll mounting members 32 of the feed roll assembly 20 are identical to one another in the example apparatus, but this is not required by the invention. Because the members of each pair are identical to one another in the illustrated example, the members of each pair are designated with identical reference numbers to simplify discussion. Each feed roll mounting member 30, 32 is affixed to a respective end of the associated central core 22, 24, respectively. To better appreciate the discussion of the structure of the apparatus 10, its operation will be briefly considered with particular reference to FIG. 2.

Generally, a master 34 (shown in dashed lines and with exaggerated thickness in FIG. 2) is inserted into the feed opening 14, and the master 34 along with unwound portions 36, 38 of stock material 26, 28 from the upper and lower feed roll assemblies 18, 20, respectively, are passed through a master processing assembly 40. The master processing assembly 40 includes a pair of cooperating pressure applying structures in the form of first and second nip rollers 42, 44, respectively. In an alternative arrangement, heating elements may be used to activate the adhesive, as is the case in a heat laminator.

The nip rollers 42, 44 are rotatably mounted within the frame 12. An actuator, which may be in the form of a crank handle 46 as shown, may be operatively connected with (one or both of) the nip rollers 42, 44. Alternatively, the actuator may be a motor that is operatively connected to one or both nip rollers to power operate the master processing assembly. The master 34 is inserted into the master processing assembly 40 together with the stock materials 26, 28 unwound from their respective feed roll assemblies 18, 20 and disposed on opposing sides of the master 34. At least one of the example stock materials 26 and/or 28 is covered with a layer of a pressure-sensitive adhesive. As the master 34 and the two layers of unwound stock material 26, 28 pass between the nip rollers 42, 44, the nip rollers perform a master processing operation. It should be understood that an actuator is not a necessary feature, and the stock materials may be advanced simply by pulling them by their lead ends through the apparatus.

During this operation the nip rollers 42, 44 apply pressure to the stock materials 26, 28 (and to the master 34 when it is between the nip rollers 42, 44) and this pressure causes adhesive bonding of each adhesive layer provided by the stock materials 26, 28 with the master 34 or opposing layer of stock material 26, 28. This bonds the stock materials to the master 34 and/or the stock materials 26, 28 to one another to form a final product (not shown) of the operation, namely the bonded master 34 and stock materials 26, 28. The final product is discharged outwardly of the discharge opening 15 by the driving action of the nip rollers 42, 44. The final product is supported as it passes outwardly of the discharge opening 15 by a substrate supporting surface 50. The substrate supporting surface 50 is configured to receive and support the processed master and stock materials discharged from the master processing apparatus in a substantially flat condition.

The details of the structure of the master processing apparatus 10 can be best appreciated from the cross sectional view of FIG. 2. The feed roll assemblies 18, 20 are removably mounted in the cartridge assembly which is, in turn, removably mounted on the frame 12. The details of the construction of the removable cartridge assembly 16 and the manner in which the pair of feed roll assemblies 18, 20 are removably mounted in the cartridge body 17 thereof are considered below.

A feed tray 52 having a substrate supporting surface 54 is movably mounted to the frame 12 on the feed side of the master processing assembly 40. Preferably the tray 52 and the frame 12 are molded plastic structures, although any suitable construction can be used. The tray 52 is mounted on the frame 12 for movement between an operative (see FIGS. 1 and 2) and an inoperative position (not shown). When the tray 52 in its operative position, it extends outwardly from the master processing assembly 40 and provides the upwardly facing substrate supporting surface 54 that supports the master 34 in a substantially flat condition as the master 34 is fed into the master processing assembly 40. The tray 52 in its inoperative position covers the feed opening 14 of the frame 12 to inhibit ingress of undesired objects into the master processing assembly 40 via the feed opening 14.

The details of the mounting of the tray are described in commonly assigned U.S. patent Appln. Ser. No. 09/987,484 which patent application is hereby incorporated its entirety into the present application for all material disclosed therein and this description will not be repeated herein.

It can be appreciated from FIG. 2 that, when the tray 52 is in its operative position, the substrate support surfaces 50, 54 are generally coplanar (along with a substrate support surface 92 provided by a portion of the cartridge assembly 16 considered below) and cooperate to define a support path that slopes slightly downwardly relative to horizontal in a direction from the feed opening 14 to the discharge opening 15. This construction facilitates insertion of a master into the opening 14 and its subsequent passage into and through the master processing assembly 40.

A cutting assembly 56 (FIG. 2) is disposed on the discharge side 15 of the master processing assembly 40 and is operable to sever a final product containing a master 34 from the continuous strips of stock material 26, 28. The cutting assembly 56 includes a blade assembly 58 and a guide member 60. The guide member 60 is movably mounted between opposing walls 62, 64 of the frame 12 and extends transversely across the discharge opening 15 generally above the substrate support surface 50. The blade assembly 58 includes a blade 66. The blade assembly 58 is mounted on the guide member 60 for guided transverse cutting movement therealong.

The guide member 60 is movably mounted to the frame 12 for selective manual movement between (a) an inoperative position (FIG. 2) in which the blade 66 is spaced above the substrate supporting surface 50 to prevent the blade 66 from cutting through the processed master 34 and stock materials 26, 28 in the event of accidental lateral movement thereof and (b) an operative position (not shown) in which a portion of the blade 66 extends downwardly below the substrate supporting surface 50 and into a laterally extending blade receiving slot 68 formed in the surface 50 of the frame 12 so the blade 66 cuts through an entire thickness of the processed master and stock materials 38 during transverse movement of the blade assembly 58.

The guide member 60 is pivotally mounted to the frame by a pair of mounting arms 70 for pivot between its operative and inoperative positions. The cutting assembly 56 is spring biased into its inoperative position. The details of the mounting and operation of the cutting assembly and related structures are described in the incorporated '484 patent application and will not be repeated herein.

The frame 12 includes first and second frame portions 72, 74, respectively, (see FIG. 2) which are connected to one another for movement relative to one another between a securing position (FIG. 2) and an open position (not shown). Each frame portion 72, 74 of the example apparatus is of shell-like, molded plastic construction, although any suitable materials and construction can be used. Frame portion 74 is pivotally mounted to frame portion 72 by a pair of integral projections (not shown) formed on opposite sides of frame portion 74 that are received within a pair of openings (not shown) formed within opposing wall portions of frame portion 74.

The pair of cooperating pressure applying nip rollers 42, 44 are constructed and arranged to be positioned adjacent one another in cooperating pressure applying relation to one another (see FIG. 2) and to be moved apart to an open access position (not shown) when the frame portions 72, 74 are moved into their open positions. That is, the lower nip roller 44 is mounted to the first frame portion 72 and the upper nip roller 42 is mounted to the second frame portion 74. Movement of the frame portions 72, 74 into their open positions therefore moves the pressure applying structures 42, 44 apart from one another into an open access position to allow the stock materials to be easily positioned therebetween. Movement of the frame portions 72, 74 into their securing positions moves the pressure applying structures 42, 44 into engagement with one another and into pressure applying engagement with the portion of the stock materials 36, 38 positioned therebetween.

Latching engagement between a latch assembly 76 on the second frame portion 74 and latch structure 78 on the first frame portion 72 holds the frame portions 72, 74 in their securing positions and biases the rollers 42, 44 against one another. The details of the mounting and operation of the frame portions 72, 74 and the nip rollers 42, 44 and related structures are described in the incorporated '484 patent application and will not be repeated herein.

When the second frame portion 74 is in its open position, the cartridge assembly can be removed and the supply of stock materials on the cartridge assembly can be replaced. After a replacement supply of stock materials is loaded in the cartridge, the cartridge can then be placed once again in the apparatus 10. The end portions of the stock materials 26, 28 on respective feed roll assemblies 18, 20 are pulled out from the rolls and positioned between the nip rollers 42, 44. The two frame portions 72, 74 are then moved back into their securing positions. Thus, moving the nip rollers apart when the frame portions 72, 74 are opened enables the operator to easily thread or feed the new stock materials between rollers 42, 44.

The Replaceable Cartridge Assembly

The replaceable feed roll assemblies 18, 20 are removably mounted within a cartridge assembly 16 to facilitate easy removal and replacement of the feed roll assemblies 18, 20. An example replaceable cartridge assembly 16 for use in the apparatus 10 is shown, for example, in FIGS. 3-5. The cartridge assembly 16 is shown in exploded view in FIG. 3. The pair of feed roll assemblies 18, 20 are removably and rotatably mounted on the cartridge body 17 by a pair of feed roll mounting structures 80, 82 (described below). Each feed roll mounting structure 80, 82 is movable between (a) a retaining position (see assembly 80 in FIG. 4, for example) in which the feed roll mounting members 30 or 32 of a feed roll assembly 18 or 20, respectively, therein are releasably held for rotational movement with respect to the cartridge body 17 so that the stock materials 26, 28 thereon can be unwound therefrom and (b) a releasing position (see assembly 82 in FIGS. 3 and 4, for example) in which a feed roll assembly 18, 20 can be moved into and removed therefrom so that a feed roll assembly 18 or 20 can be removed and replaced with a replacement feed roll assembly 18, 20.

A feed roll assembly 18, 20 from which the supply of stock material has been depleted, for example, can be removed and replaced with a new feed roll assembly 18, 20 having a new supply of stock material. It should be noted, however, that the supplies of stock materials 26, 28 need not be exhausted when the user decides to replace one or both feed roll assemblies 18, 20. For example, a user who opts to use a different stock material may replace the stock materials 26, 28 with a different type well before the stock materials 26, 28 are depleted. It should also be noted that the user may replace only one of the feed roll assemblies 18 or 20 or may replace both of the feed roll assemblies 18, 20. For example, when performing adhesive transfer operations, the user may want to change adhesives. In that case, only the adhesive supply roll needs to be changed, as the mask substrate in the other roll is usually not adhesive specific.

The cartridge body 17 and the first and second feed roll assemblies 18, 20 mounted therein are constructed and arranged such that when the cartridge body 17 is removably mounted to the apparatus frame 12, the master 34 and unwound portions 36, 38 of the first and second stock materials 26, 28 can be inserted into the master processing assembly 40 with the stock materials 26, 28 being disposed on opposing sides of the master 34. The actuator 46 can then be operated to cause the master processing assembly 40 to perform its master processing operation.

The cartridge body 17 includes a central opening 84 (see FIGS. 1 and 2, for example). The feed roll assemblies 18, 20 are mounted on each side of the opening 84. During a master processing operation, a master 34 passes through the opening 84 and between the feed roll assemblies 18, 20. The cartridge body 17 includes a substrate supporting member 86 which extends between opposing sidewalls 88, 90 of the cartridge body 17. The substrate supporting member 86 generally defines the lower portion of the opening 84. As the master 34 passes through the opening 84, it is supported by an upwardly facing surface 92 of the supporting member 86.

When the cartridge body 17 is removably mounted to the apparatus frame 12, the substrate supporting surface 92 is positioned on the feed side of the master processing assembly 40. The substrate supporting surface 92 supports the master 34 in substantially flat condition while the master 34 is being fed into the master processing assembly 40 (see FIG. 2). The substrate supporting surface 92 is generally co-planar with and immediately adjacent to the substrate supporting surface 54 of the feed tray 52 so that together these surfaces 54, 92 continuously support the master 34 from the feed tray 52 to the master processing assembly 40.

The example cartridge assembly 16 also includes a master engaging structure 94 extending forwardly into the cartridge opening 84. The example master engaging structure 94 is of molded plastic construction and is pivotally mounted between the opposing sidewalls 88, 90 of the cartridge assembly 16. A master engaging end 96 of the master engaging structure 94 extends generally transversely across the substrate supporting surface 92 and provides a master engaging surface 130 that engages the master 34 while the master is supported on the substrate supporting surface 92. The master engaging structure 94 includes a master engaging surface 96 that engages the master 34 and applies a frictional resistance to the advancement of the master 34 in a feeding direction to thereby tension the master to prevent the same from wrinkling, for example, as it goes into the master processing assembly 40. The presence of either or both the master engaging structure 94 and the supporting surface 92 is not critical and should not be considered limiting.

Figure 3:
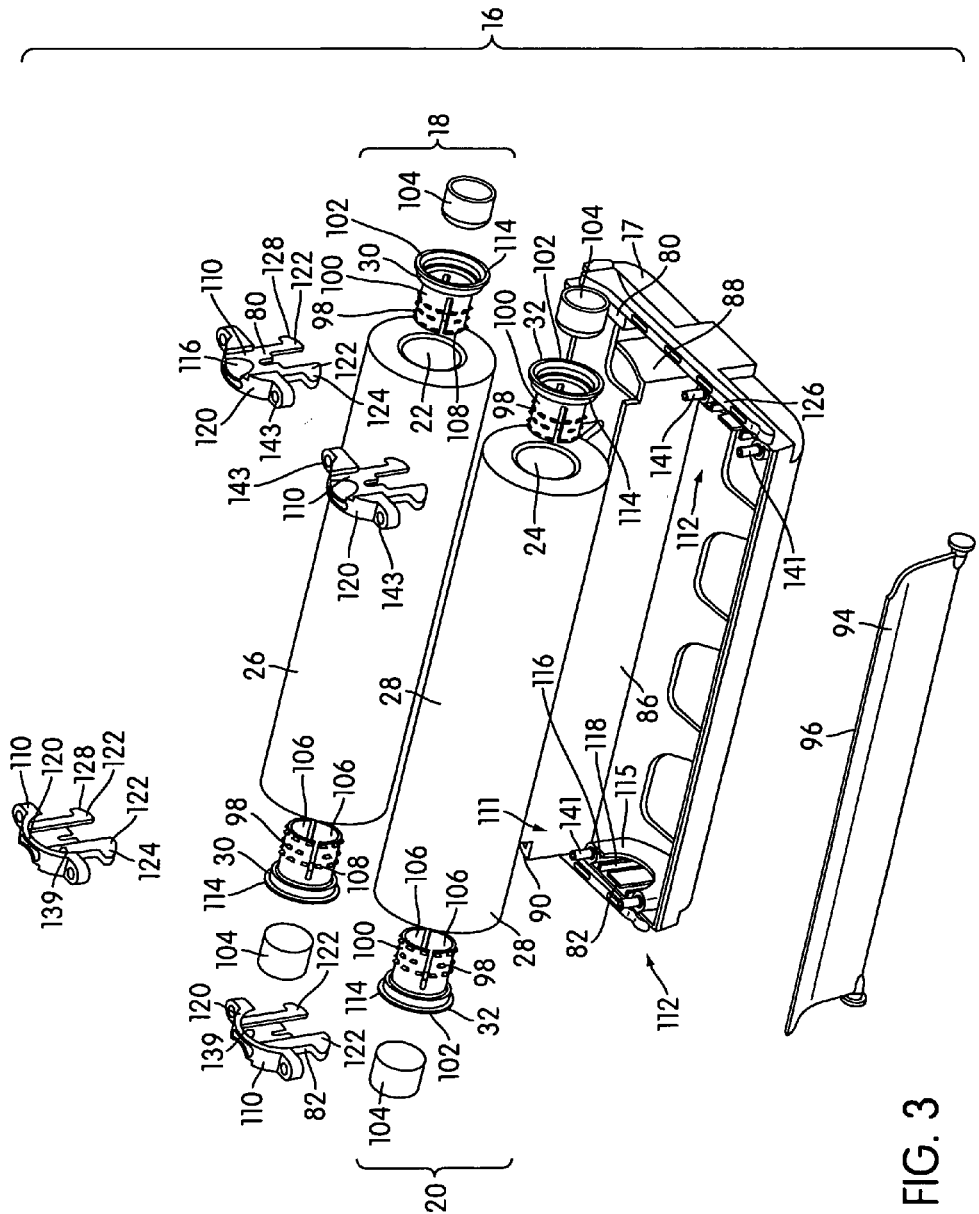
FIG. 3 is a partially exploded view of the cartridge assembly generally from its discharge side, the cartridge assembly being constructed according to the principles of the present invention.
Figure 4:
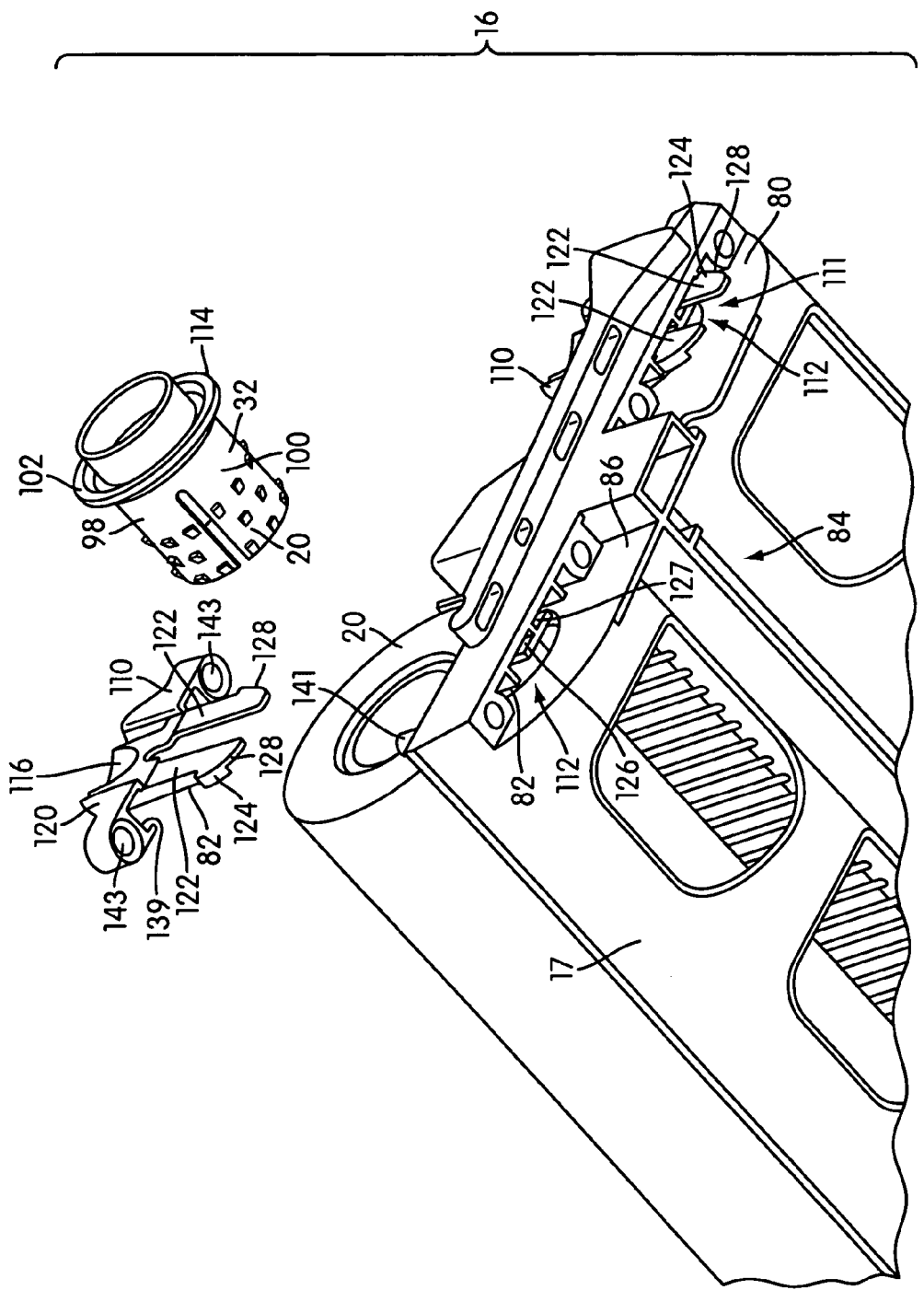
FIG. 4 is a close-up partially exploded view of a portion of the cartridge assembly from the feed side thereof, the view showing a portion of a feed roll, a feed roll mounting member and a feed roll mounting structure in exploded relation with one another.

The details of the construction of the feed roll assemblies 18, 20 can best be understood from the exploded views of FIGS. 3 and 4. Because the feed roll assemblies 18, 20 are identical to one another in the example cartridge assembly 16, only feed roll assembly 18 will be considered in detail, but the discussion applies equally to feed roll assembly 20. Corresponding portions of the two feed roll assemblies 18, 20 are identified by identical reference numbers.

The stock material 26 is in the form of a long, continuous strip wound around the central core 22. Typically the core 22 is of tubular construction and is made of a heavy cardboard or paper. Other constructions and materials are possible, however. For example, the central core 22 can be solid, or could be made of any suitable material such as a plastic. A feed roll mounting member 30 in the form of an end cap 98 is mounted in each end of the core 22. The end caps 98 are constructed to be received in one of the feed roll mounting structures to rotatably mount the feed roll assembly 18 in the cartridge body 17.

Each end cap 98 in the example feed roll assembly 18 is an integral molded plastic structure that includes a tubular core securing portion 100 and a mounting portion 102 connected to the core securing portion 100. The core securing portion 100 is normally in a relaxed, unexpanded condition to enable insertion of the securing portion 100 into an end of a central core 22. After the securing portion has been inserted into an end of the central core 22, an expansion member 104 is inserted into the core securing portion 100. The size and configuration of the expansion member 104 causes or tends to cause the securing portion 100 to expand generally radially into a force-fit relation with the interior surface of the core 22. This force-fit relation secures the end cap 98 to the core 22.

More specifically, the securing portion 100 of each end cap 98 is in the form of a cylinder split into quarter sections to define a plurality of resilient tabs 106. Each tab 106 is covered with a plurality of core gripping teeth 108. Each expansion member 104 is in the form of a plug which, when inserted into the interior of the securing portion 100 of the end cap 98, forces the tabs 106 of the securing portion 100 to move radially outwardly and causes the teeth 108 to become embedded in the cardboard of the core 22. The construction of the end cap and the manner in which the same is mounted to the central core 22 is described in greater detail in the incorporated '484 application.

Alternatively, the end cap 98 can be secured to the central core 22 with an adhesive. As another alternative, a central core and the feed roll mounting members secured thereto can be of one piece integral construction (and made of a molded plastic, for example). The structure defined by the end caps 98 and the central core 22 can have any other suitable construction.

Figure 5:
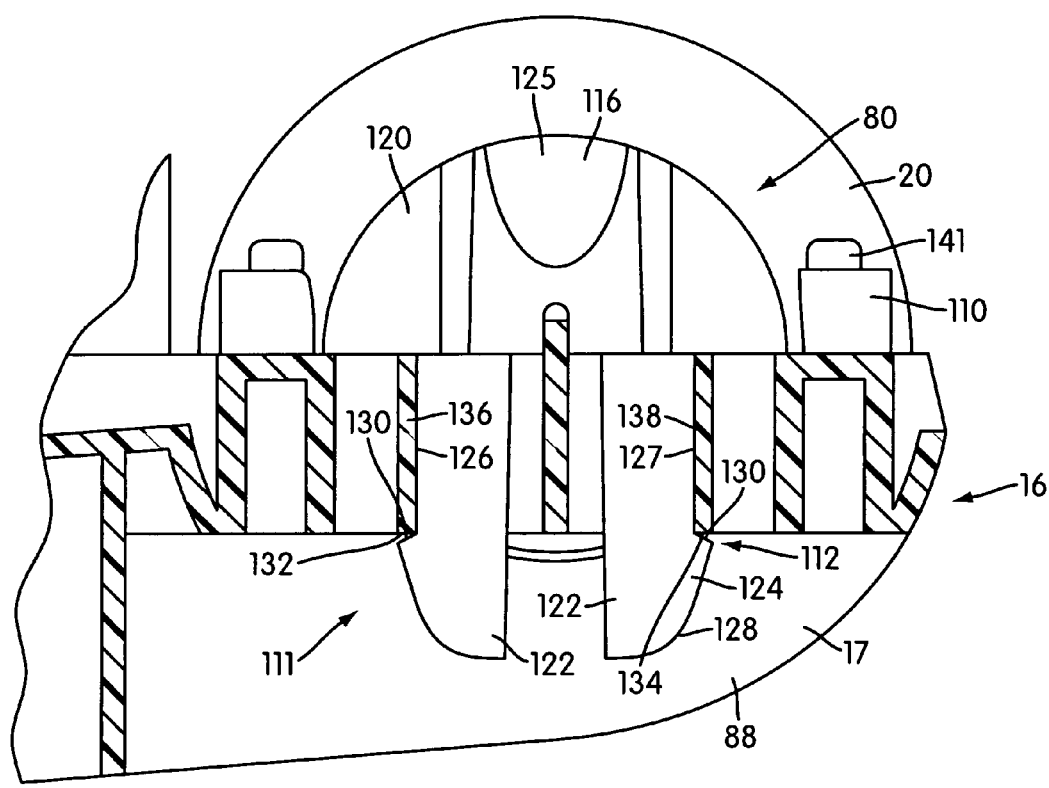
FIG. 5 is a cross sectional view of the assembled cartridge assembly taken generally through the line 5-5 of FIG. 4.

The manner in which the end caps 98 of the feed roll assembly 18 are removably mounted in the feed roll mounting structure 80 of the cartridge body 17 can be best appreciated from FIGS. 3-5. Because the feed roll assemblies 18, 20 are identical to one another in the example cartridge assembly 16 and because the feed roll mounting structures 80, 82 are identical to one another in the example cartridge assembly 16, the discussion will focus primarily on the manner in which feed roll assembly 18 is removably mounted in feed roll mounting assembly 80 only, but the discussion applies equally to assembly 20 and structure 82 as well.

Each example of a feed roll mounting structure 80, 82 is comprised of a pair of retainer members 110 (all retainer members are identical in the example apparatus and will therefore be identified and described using identical reference numbers) and structure on the cartridge body 17 for releasably retaining the retainer members 110 thereon. This structure on the cartridge body 17 includes a pair of feed roll receiving portions, generally designated 111, that include structure for receiving the feed roll mounting members 30, 32 of the associated feed roll assembly 18 or 20 and include structure for receiving the retainer members 110 of the feed roll mounting structures 80, 82 as explained below. Each retainer member 110 is releasably mounted to a respective portion of the cartridge body 17 for movement between a retaining position in which the securing member 110 is removably secured to the cartridge body 17 (see assembly 80 in FIG. 4 or FIG. 5, for example) and a releasing position in which the retainer member 110 is released from and moved away from the cartridge body 17 (see assembly 82 in FIG. 3 or FIG. 4, for example). Each pair of retainer members 110 in the securing positions thereof cooperate with structure generally designated 112 (see FIGS. 4 and 5, for example) on the respective portions of the cartridge body 17 to hold a respective feed roll mounting member 30 of the feed roll assembly 18 for rotational movement. The retainer members 110 are removable from the cartridge body 17 to allow removal and replacement of a feed roll assembly 18.

Each feed roll mounting member 30 of the example feed roll assembly 18 includes a generally radially extending annular flange 114. When each feed roll mounting member 30 is mounted on the feed roll assembly 18, the annular flange 114 thereof is fixedly mounted in spaced relation with a respective end of the central core 22. Each annular flange 114 is rotatably received in a flange receiving recess 115 (see FIGS. 3 and 10, for example) formed in the cartridge body 17 and is releasably held on the cartridge body 17 by the retainer members 110 as described below.

Figure 8:
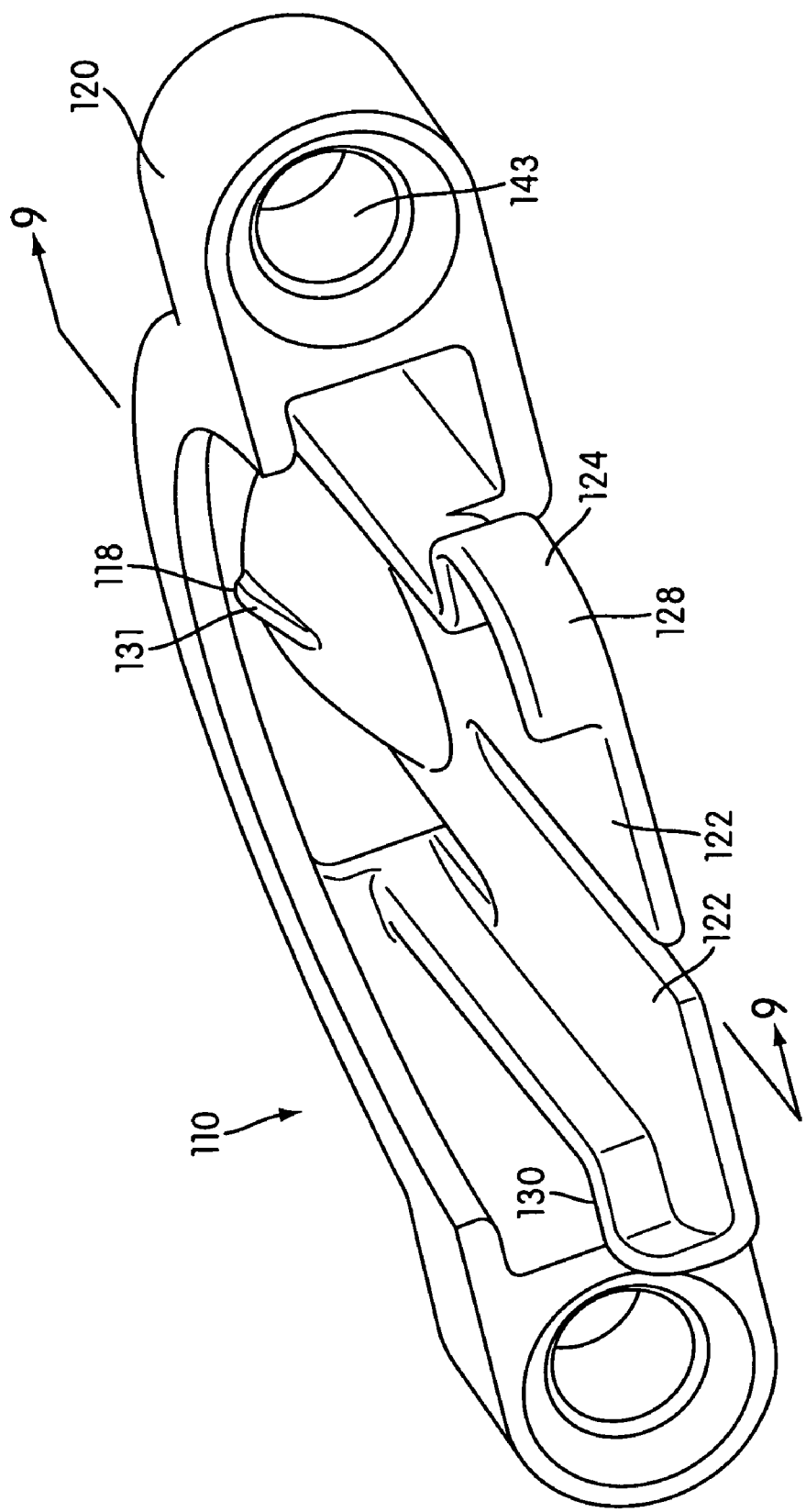
FIG. 8 is a perspective view of a securing member.
Figure 9:
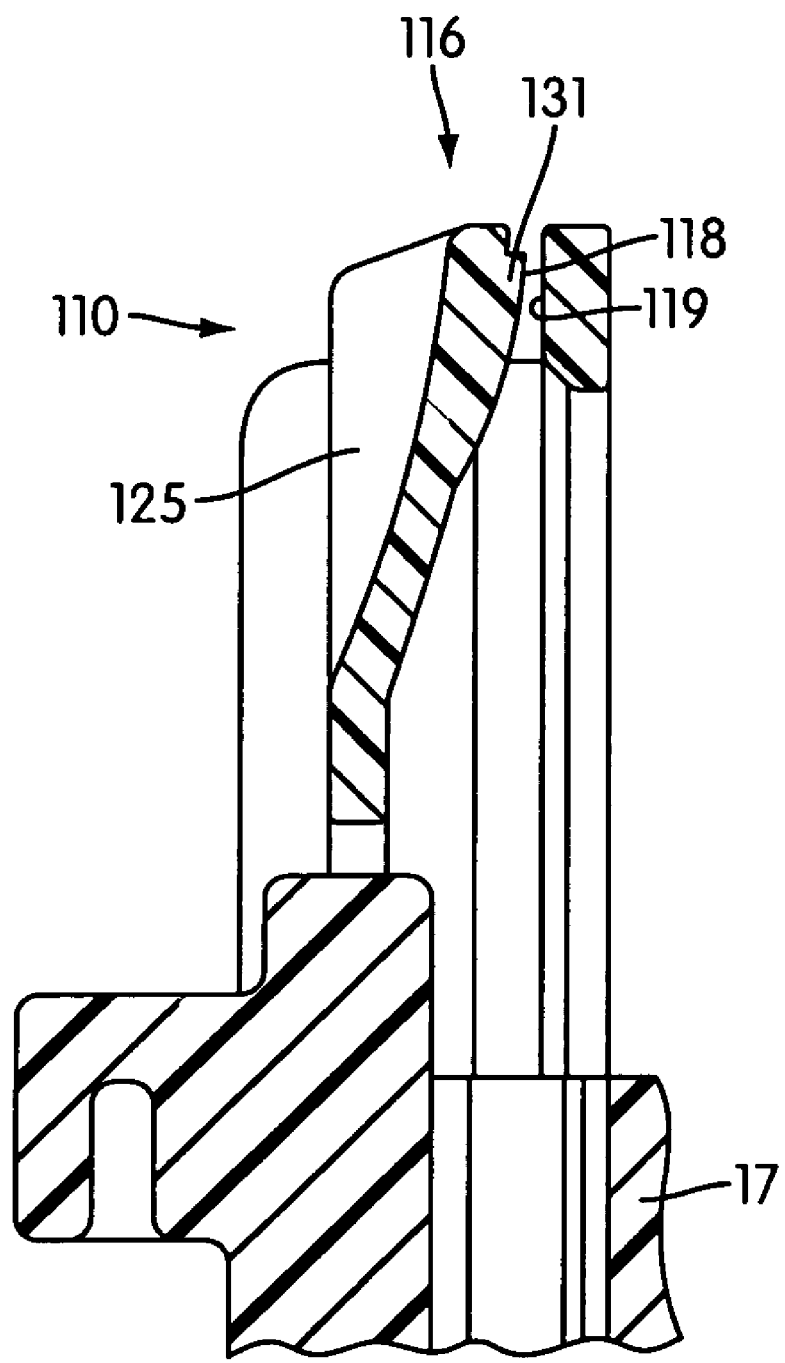
FIG. 9 is a cross-sectional view of a portion of the securing member taken through the line 9-9 of FIG. 8 and showing the securing member mounted to a portion of a cartridge body of the cartridge assembly.
Figure 10:
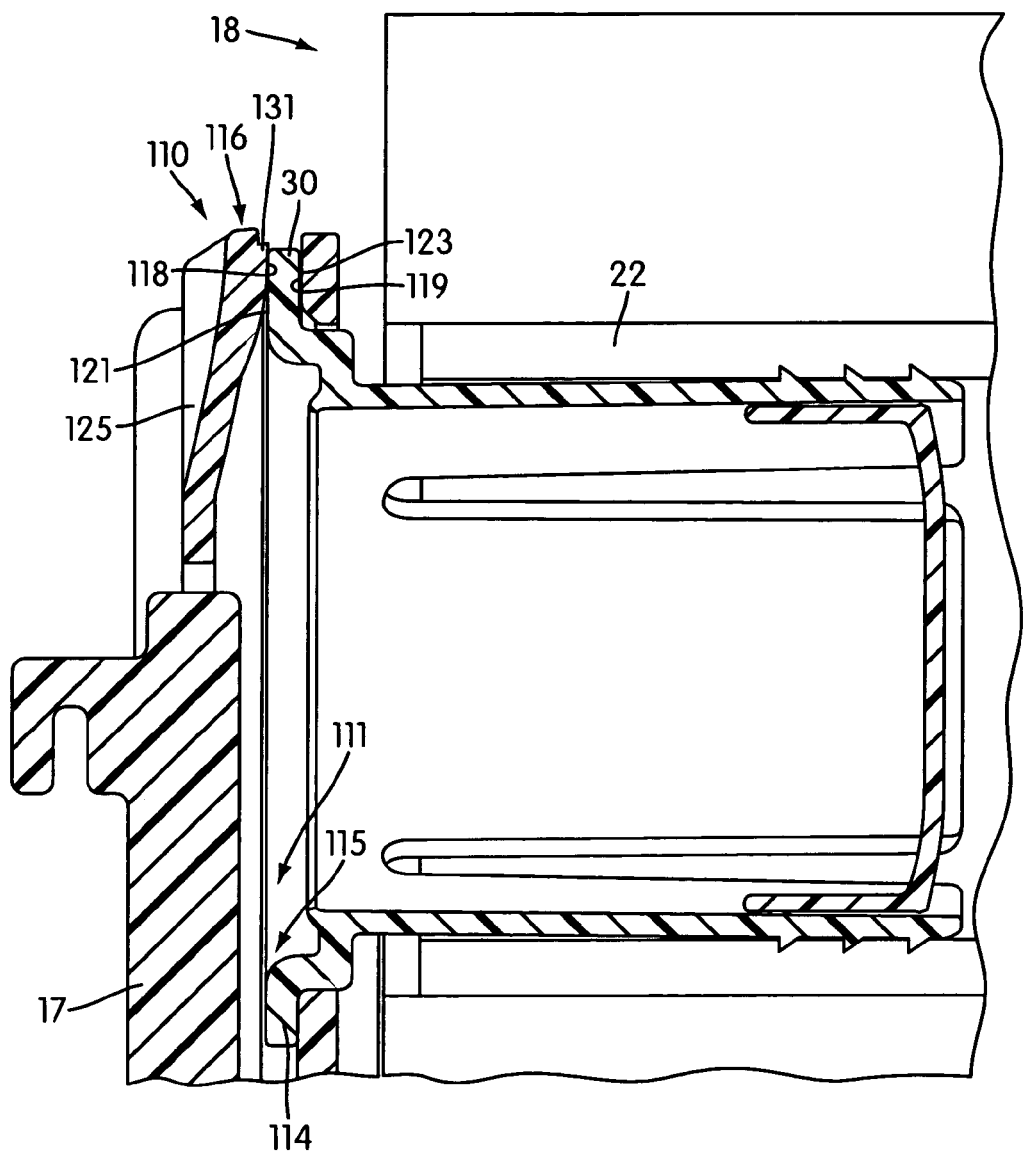
FIG. 10 is a cross-sectional view similar to FIG. 9 except showing a cross-sectional view of a portion of an end cap mounted in the securing member.

The cooperating structure between the retainer members 110 and the associated portions of the cartridge body 17 of each feed roll mounting structure 80, 82 may optionally provide a pre-tension brake (as shown in the example apparatus 10) that includes a pair of brakes 116 (see FIGS. 3 and 8-10, for example) frictionally engaging opposing sides of each annular flange 114. The pre-tension brake of each feed roll mounting structure is constructed and arranged such that as the feed roll assembly thereof rotates during the unwinding of the stock material therefrom, each feed roll mounting structure applies a braking force to the associated feed roll assembly to tension the unwound portion of the stock material. This tensioning of the unwound portions of the stock materials has many advantages, such as preventing the stock materials from wrinkling when being applied to a master and preventing the stock materials from sticking to themselves or to structures within the apparatus 10. Each feed roll mounting structure may also optionally be constructed and arranged such that the braking force applied thereby to the associated feed roll assembly progressively decreases as the stock material is unwound therefrom. An example of a pre-tension brake for effecting this type of operation is shown in FIGS. 8-10 and is discussed below. As will become apparent, this latter arrangement is advantageous for many reasons including that because the braking force applied to each feed roll assembly progressively decreases as the stock material is unwound, the amount of force required to unwind stock material from each core remains essentially constant as the supply of stock material on each feed roll assembly is depleted.

In the example apparatus 10, each retainer member 110 is constructed and arranged such that as the feed roll assembly 18, 20 associated therewith rotates during the unwinding of the stock materials therefrom, each securing member 110 applies a braking force to the associated feed roll assembly 18, 20. The particular example of a securing member 110 included in the apparatus 10 is constructed and arranged such that the braking force applied thereby to the associated feed roll assembly 18, 20 progressively decreases as the stock material is unwound therefrom.

More specifically, when the feed roll mounting members 30 are removably mounted in a feed roll mounting structure 80 and the stock material 26 is being unwound from the core 22, the core 22 and the feed roll mounting members 30 rotate as a unit relative to the securing members 110 of the feed roll mounting structure 82. The frictional engagement between the brakes 116 and the annular flange 114 optionally create a braking friction therebetween. As will become apparent, each end cap 98 and the associated brake 116 cooperate to provide frictional resistance to the rotational movement of the associated feed roll assembly 18 when the stock material 26 is being unwound by the action of the nip rollers 42, 44.

The frictional engagement between a pre-tension brake 116 and the associated annular flange 114 disposed therein may be provided in many ways. For example, the recess and flange may be constructed to provide a slight interference fit between the recess and flange.

In the example cartridge assembly 16, each brake 116 includes a pair of brake surfaces 118, 119 (shown, for example, in FIGS. 9 and 10) which frictionally engage respective opposing sides 121, 123 of each annular flange 114 of the end cap 98. When the cartridge assembly 16 is removably mounted on the apparatus frame 12 and the stock material 26 is being unwound from the core 22, the core 22 along with the annular flange 114 fixed thereon rotates relative to the cartridge body 17 and the retainer members 110 (including the brakes 116) so that braking friction is created between the surfaces 121, 123 of each flange 114 and the braking surfaces 118, 120 of the pre-tensioning brake 116.

The construction and operation of a pre-tensioning brake suitable for incorporation in each feed roll mounting structure 80, 82 of the present invention is shown in detail in the above incorporated '484 patent application. Each example retainer member 110 is constructed of a molded plastic material. Suitable molded plastic materials are described in the '484 application and are included herein by reference. The pre-tension brake 116 of the retainer member 110 includes a flexible molded plastic braking structure 125. As shown and described in detail in the incorporated '484 application, the flexible molded plastic braking structure 125 provides one of the braking surfaces 118 thereon. Each pre-tension brake 116 is constructed and arranged such that when the opposite sides 121, 123 of the flange 114 are frictionally engaging the pair of braking surfaces 118, 120, the braking structure 125 is in a relatively highly flexed condition (see FIG. 10, for example) so that the pair of braking surfaces 118, 120 provide a relatively high degree of braking friction to the central core 22. The molded plastic protrusion or bump 131 of the braking structure 125 wears down as the stock material is unwound from the associated core, thereby progressively lessening the degree of flexure of the braking structure 125 such that the amount of braking friction applied by the braking surfaces 118, 120 to the flange 114 and to the core 22 progressively decreases so that the amount of force required to unwind stock material remains essentially constant as the stock materials are depleted.

This frictional engagement prevents the feed roll assembly 18 from rotating at a faster rate than is required to supply stock material 26 to the nip rollers 42, 44 (i.e., overrotating). This keeps the unwound portion 36) of stock material 26 between the feed roll 18 and the nip rollers 42, 44 taut, which prevents the stock material 26 from wrinkling on the master 34 or adhering to itself prior to being fed to the nip rollers 42, 44. In the example cartridge assembly 16 this pre-tensioning brake arrangement (between the end cap 98 and the brake 116) is provided at each end of each feed roll assembly 18, 20, but other constructions are possible. For example, as an alternative, one brake could be provided at each end of each feed roll assembly, with the other opposite end of each feed roll assembly being free wheeling (that is, having no frictional engagement that would tend to slow or dampen roller rotation).

Each molded plastic retainer member 110 includes a body portion 120 and a pair of leg portions 122 that extend outwardly from the body portion 120. A locking structure 124 is integrally formed on an end portion of each leg 122. The cartridge body 17 includes a pair of openings or channels 126, 127 constructed and arranged to releasably lockingly receive the pair of legs 122 of the associated securing member 110. This locking arrangement is best understood from the cross-sectional view of FIG. 5.

Each leg 122 includes an arcuate side surface 128 which facilitates entry of the legs 122 into the respective channels 126. The legs 122 are resilient, flexible structures that snap fit into releasably locked engagement with structure on the cartridge body 17 (as explained below). When the legs 122 are manually pushed through the channels 126, the legs 122 resiliently flex or bend to allow passage of the locking structures 124 on the respective legs 122 through the respective channels 126. When the locking structures 124 pass through the open opposite end of the respective channels 126, the legs 122 spring back into their relaxed or memory positions. Each locking structure 124 includes a locking surface 130 which lockingly engages a lower edge portion 132, 134 of an associated wall structure 136, 138 on the cartridge body 17 that defines part of the respective channel 126, 127. The locking engagement between the locking surface 130 and the edge portion 132, 134 of the wall 136, 138 releasably locks the securing member 110 on the cartridge body 17. When both retainer members 110 are locked on the cartridge body 17, the feed roll mounting member 30 at each end of the core 22 of the feed roll assembly 18 is releasably locked in rotational engagement with the associated feed roll mounting structure 80.

Figure 7:
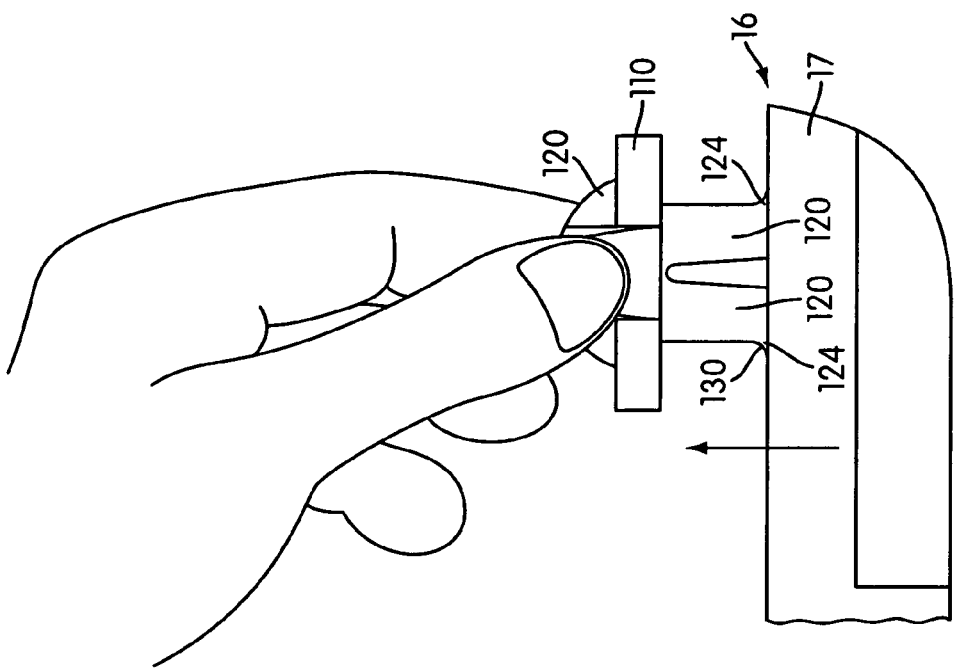
FIGS. 6 and 7 are schematic views illustrating the removal of a securing member from a cartridge body of the cartridge assembly.
Figure 6:
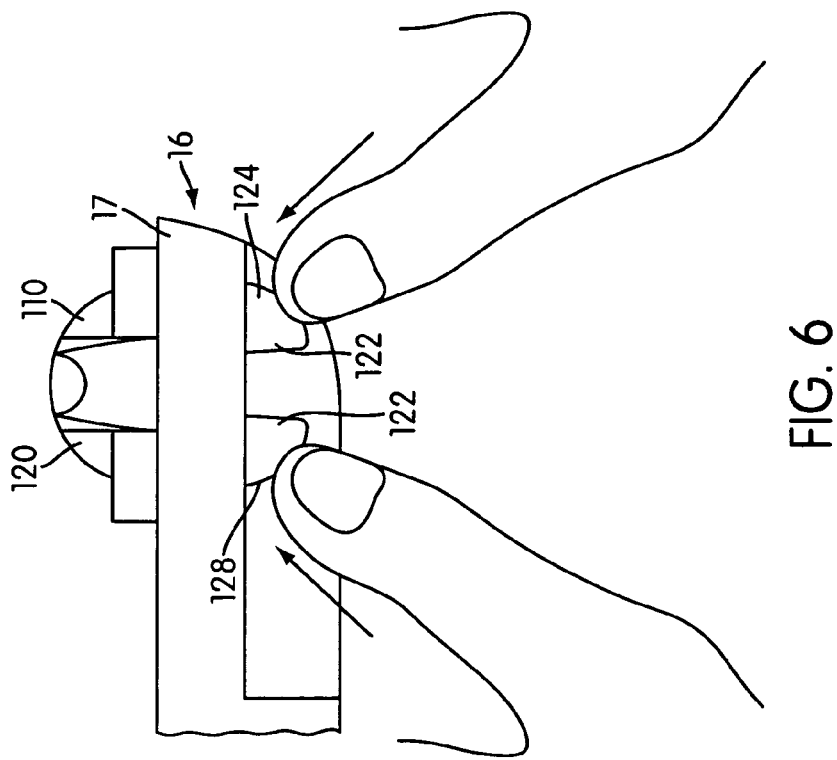

The removal and replacement of a feed roll mounting structure can be understood from FIGS. 6 and 7. A feed roll mounting structure is not shown in FIGS. 6 and 7 to more clearly illustrate the removal of a retainer member 110 from the cartridge body 17. To remove a feed roll mounting structure for replacement of the same, the operator manually pinches the free ends of the legs 122 toward one another as indicated by the directional arrows of FIG. 6 and then lifts the retainer member 110 out of engagement with the cartridge body 17 as indicated by the directional arrow of FIG. 7. The feed roll assembly can then be removed and replaced with another feed roll assembly carrying a different type of stock material, for example, or with a new feed roll assembly having a fresh supply of stock material.

It can be appreciated from FIG. 4 that the body portion 120 of each retainer member 110 includes a recess 139 constructed and arranged to rotatably receive a portion of the associated annular flange 114 of the feed roll assembly 18. When a securing member 110 is mounted on the cartridge body 17, a pair of posts 141 integrally formed on the cartridge body 17 are received within a pair of openings 143 in the body portion 120 of the retainer member 110. The posts 141 help stabilize and align the retainer member 110 with respect to the cartridge body 17.

The posts 141 can also optionally be "heat staked" or welded in the openings 143 if the manufacturer, for example, chooses to permanently affix the retainer members 110 to the cartridge body 17. During heat staking, the plastic material of the post 141 and/or the body portion 120 is heated to fuse or bond the structures 120 and 141 to one another. Thus, this construction (in which the securing members are snap fit in place on one or more heat stakes) provides the manufacturer with the ability to either permanently or removably mounting the feed roll assemblies 18, 20 in the cartridge body 17. This may be an advantage, for example, because the manufacturer may decide to offer consumers a choice between purchasing a cartridge assembly having removable feed roll assemblies 18, 20 or purchasing a cartridge assembly having non-removable feed roll assemblies 18, 20. For instances in which the cartridge body and retainer members are made of a molded plastic, the same die sets can be used to make cartridge bodies and the securing members for both types of cartridge assemblies. The snap fit construction also provides the manufacturer with a way of positioning the retainer members in the cartridge body and holding them in place for heat staking.

Operation

To perform a master processing operation, the latch assembly 76 is unlatched and the second frame portion 74 is moved into its open position (not shown). A cartridge assembly 16 is placed inside the frame 12 and leading portions 36, 38 of the stock materials 26, 28 from the upper and lower feed roll assemblies 18, 20, respectively, are unwound and placed between the nip rollers 42, 44. The second frame portion 74 is returned to its securing position, which moves the nip rollers 42, 44 into engagement with one another and into pressure applying engagement with the portion of the stock materials positioned therebetween. Each nip roller 42, 44 has a rigid metal core 140 and an outer layer 142 of a resilient, rubber-like material. The upper nip roller 42 is held in proper alignment with respect to the lower nip roller 44 by the operation of roller guide tracks as described in the above incorporated '484 patent application.

A document or other master 34 to be covered with stock material is placed on the substrate support surface 54 of the feed tray 52 and pushed through the feed opening 14 in the frame 12 and through the opening 84 in the replaceable cartridge assembly 16 until a document comes into contact with the unwound portions 36, 38 of the stock materials 26, 28. At least one of the unwound portions 36, 38 is coated with an adhesive so that the document adheres thereto. The operator then rotates the crank handle 46 which causes the nip rollers 42, 44 of the master processing assembly 40 to rotate. Rotation of the nip rollers 42, 44 drives the master 34 and the stock materials therebetween and then outwardly towards the discharge opening 15 in the frame 12. As the stock materials (with or without the master 34 therebetween) pass between the nip rollers 42, 44, the nip rollers apply pressure to the stock materials 26, 28 to activate the pressure sensitive adhesive and adhere the stock materials 26, 28 to opposing sides of the master 34 and/or to one another.

The master engaging structure 94 applies a frictional force to the master 34 as it is pulled between the driving rollers 42, 44. This frictional force tends to keep the master 34 flat and taut as it passes between the rollers 42, 44. The brake surfaces provided by the feed roll mounting structures 80, 82 frictionally engage the annular flanges 114 which keeps the unwound portions 36, 38 of the stock materials 26, 28 between the feed roll assemblies 18, 20 and the nip rollers 42, 44 taut. This prevents wrinkling of the stock material 26, 28 on the master 34 and also prevents the unwound portions 36, 38 of the stock materials 26, 28 from adhering to themselves or to each other before they pass between the nip rollers 42, 44.

When the entire length of the master 34 has been covered with stock material 26, 28, the final product passes through the discharge opening 15. When the master 34 has cleared the discharge opening 15, the operator stops rotation of the crank handle 46 and uses the blade 66 of the cutting assembly 56 to sever the final product from the continuous strip of stock materials 26, 28.

In an alternative embodiment for laminating apparatuses, the stock materials may be coated with a heat-activated adhesive. In such an apparatus, heating elements would be provided in the master processing assembly 40 upstream of the nip rollers (or other pressure applying structures) to soften or melt the adhesive prior to application of pressure by the nip rollers. For example, a pair of heating platens could be positioned on opposing sides of the stock materials in order to heat the adhesive prior to reaching the nip rollers. Alternatively, heating elements could be provided in the nip rollers themselves so as to simultaneously heat and apply pressure to the stock materials. The master processing assembly used in an apparatus constructed in accordance with this invention may have any suitable construction.

When the supply of stock of materials 26, 28 is exhausted from the feed roll assemblies 18, 20 (or when the operator chooses to change one or both of the stock materials being used in the apparatus for some other reason), the operator can replenish (or change) the supply by unlatching the apparatus 10, moving the first and second frame portions 72, 74 into their open position relative to one another and removing the cartridge assembly 16 from the frame 12. The operator then moves the four retainer members 110 into their releasing positions (in a manner described above) and removes each feed roll assembly 18, 20 from the cartridge body 17. When the retainer members holding a particular feed roll assembly are removed, the feed roll assembly can be lifted out of the cartridge body 17 and replaced with a new (or different) feed roll assembly having a fresh (or different) supply of stock materials. The four retainer members 110 can then be pushed back into locked engagement with the cartridge body 17 to hold the feed roll assembly in the cartridge body 17, or optionally, if the retainer members 110 are of the type that include a pre-tension brake that wears down as stock material is removed from the feed roll assembly 18, 20, a new set of retainer members 110 having bumps 131 that are in a new, unworn condition. The cartridge assembly 16 is then re-mounted on the frame 12 of the apparatus 10 and the stock materials 26, 28 are fed through the nip rollers 42, 44 of the master processing assembly 40 as described above. The second portion 74 of the frame 12 is then moved back into its securing position and latched to the first portion 72. The apparatus 10 is then ready to resume processing masters. As mentioned, in some instances only one feed roll assembly needs to be removed and replaced with a replacement feed roll assembly 18 or 20. For example, an operator performing an adhesive transfer operation with the apparatus may wish to remove one of the feed roll assemblies 18 or 20 and replace it with a feed roll assembly having a different type of adhesive. In this instance, the operator needs only change one roll, the adhesive roll, and does not need to replace the mask roll. The arrangement provided by the present invention allows the operator to have the flexibility to do this type of single roll replacement operation.

It can be appreciated that the embodiment of the master processing apparatus shown and described herein is an example only and is therefore intended only to illustrate the principles of the invention, but not limit the scope of these principles. For example, the apparatus illustrated and described herein includes an actuator. An actuator is optional, however, and may not be present in some apparatuses in which a cartridge assembly having removable feed roll assemblies is used. Additionally, the feed roll mounting system may be provided by feed roll mounting structure similar to these at 80, 82, or having any other suitable construction, that are attached to or integral with the apparatus frame. Thus, the presence of the cartridge is not required.

Thus, many features and advantages of the present invention are apparent from the detailed description of the invention and the drawings. It is intended by the appended claims to cover the many features, aspects and advantages of the described invention which follow from the spirit and scope of the invention. Further, since numerous modifications and changes will readily occur to those of ordinary skill in the art, it is not desired or intended to limit the invention to the exact construction and operation illustrated and described herein. Accordingly, all suitable modifications and equivalents of the cartridge assembly fall within the spirit and scope of the invention.

The invention claimed is:

1. A feed roll system to be used in conjunction with a master processing apparatus having a frame and a master processing assembly, the master processing assembly being constructed and arranged to perform a master processing operation wherein the processing assembly causes adhesive bonding between a stock material and a master fed therein, the feed roll system comprising:
a core;
a supply of stock material wound about the core;
a pair of flanges extending radially from opposing ends of the core; and
feed roll mounting structure constructed and arranged to be removably mounted to the frame of said apparatus for removably mounting said feed roll, said feed roll mounting structure providing a pair of flange receiving spaces each providing a pair of brake surfaces,
said flanges being received in said flange receiving spaces such that said brake surfaces frictionally engage opposing sides of said flanges such that, when said feed roll mounting structure is removably mounted on the apparatus frame and said stock material is being unwound from said core, said core with said flanges thereon rotates relative to said feed roll mounting structure so that braking friction is created between said flanges and the brake surfaces.

2. A feed roll system according to claim 1, wherein the core is a substantially tubular structure.

3. A feed roll system according to claim 2, wherein each flange is constructed of a molded plastic material and attached to the core.

4. A feed roll system according to claim 3, wherein the core is constructed of a paper or a cardboard.

5. A feed roll system according to claim 1, wherein the core and the flanges are separately formed and attached to one another.

6. A feed roll system according to claim 1, wherein one surface of the stock material has adhesive.

7. A feed roll system according to claim 6, wherein the opposite surface of the stock material has a release material and the stock material is wound about the core with the adhesive engaging the release material.

8. A feed roll system according to claim 1, wherein the stock material is devoid of adhesive.

9. A feed roll system according to claim 1, wherein the stock material is an adhesive mask substrate.

10. A feed roll system according to claim 1, wherein the stock material is an adhesive transfer substrate comprising a release liner with release material on one surface thereof and adhesive on the opposite surface thereof.

11. A feed roll system according to claim 1, wherein the stock material is a transparent laminating film.

12. A feed roll system according to claim 1, wherein the stock material comprises a magnetized substrate with adhesive on one surface thereof.

13. A feed roll system according to claim 12, wherein the magnetized substrate has a release material on an opposite surface thereof.

14. A feed roll system according to claim 1, wherein said core is substantially tubular and said flanges are provided on a pair of end caps, each of the end caps having a substantially tubular core securing portion and a mounting portion connected to the core securing portion, said core securing portions being inserted in opposing ends of said core;

the end caps each further comprising an expansion member, each expansion member being disposed in said core securing portion of a respective end cap to radially expand the core securing portions of the end caps into a force fit relation with the interior surface of the core to secure the end caps to the core.

15. A feed roll system according to claim 14, wherein said core is constructed of a paper or a cardboard material and wherein each core securing portion is in the form of a cylindrical tube having a split free end, said split free end of each core securing portion defining a plurality of tabs, each tab including gripping structure on the exterior thereof, each expansion member being disposed in each said securing portion to radially expand said tabs such that said gripping structures grip said paper or cardboard material.

16. A feed roll set to be used in conjunction with a master processing apparatus having a frame and a master processing assembly, the master processing assembly being constructed and arranged to perform a master processing operation wherein the processing assembly causes adhesive bonding between stock materials and a master fed therein, the feed roll set comprising:

a pair of feed roll systems each comprising:
a core;
a supply of stock material wound about the core; and
a pair of flanges extending radially from opposing ends of the core;
wherein at least one of the stock materials has adhesive on a surface thereof for providing the adhesive bonding during said master processing operation;
the feed roll set further comprising:
feed roll mounting structure constructed and arranged to be removably mounted to the frame of said apparatus for removably mounting said feed rolls, said feed roll mounting structure providing two pairs of flange receiving spaces each providing a pair of brake surfaces,
said flanges being received in said flange receiving spaces such that said brake surfaces frictionally engage opposing sides of said flanges such that, when said feed roll mounting structure is removably mounted on the apparatus frame and said stock materials are being unwound from said cores, said cores with said flanges thereon rotate relative to said feed roll mounting structure so that braking friction is created between said flanges and the brake surfaces.

17. A feed roll set according to claim 16, wherein the core of each feed roll system is a substantially tubular structure.

18. A feed roll set according to claim 17, wherein each flange is constructed of a molded plastic material and attached to the core of each feed roll system.

19. A feed roll set according to claim 18, wherein the core of each feed roll system is constructed of a paper or a cardboard.

20. A feed roll set according to claim 16, wherein the core and the flanges of each feed roll system are separately formed and attached to one another.

21. A feed roll set according to claim 16, wherein only one of the stock materials has adhesive on a surface thereof and the other of the stock materials is devoid of adhesive.

22. A feed roll set according to claim 21, wherein an opposite surface of the stock material with adhesive has a release material and is wound about its core with the adhesive engaging the release material.

23. A feed roll set according to claim 16, wherein both the stock materials have adhesive on a surface thereof.

24. A feed roll set according to claim 23, wherein an opposite surface of each of the stock materials has a release material and the stock materials are wound about the cores with the adhesives engaging the release materials.

25. A feed roll set according to claim 16, wherein one of the stock materials is an adhesive mask substrate and the other stock material is an adhesive transfer substrate comprising a release liner with release material on one surface thereof and adhesive on the opposite surface thereof.

26. A feed roll set according to claim 25, wherein the adhesive mask substrate has an affinity for bonding with said adhesive.

27. A feed roll set according to claim 26, wherein the adhesive mask substrate has a release material so as to discourage bonding of said adhesive with said mask substrate.

28. A feed roll set according to claim 16, wherein both the stock materials are transparent laminating films.

29. A feed roll set according to claim 28, wherein both the laminating films have adhesive on a surface thereof.

30. A feed roll set according to claim 28, wherein only one of the laminating films has adhesive on a surface thereof.

31. A feed roll set according to claim 16, wherein one of the stock materials comprises a magnetized substrate with adhesive on one surface thereof and the other stock material is an adhesive mask substrate.

32. A feed roll set according to claim 31, wherein the adhesive mask substrate has an affinity for bonding with said adhesive.

33. A feed roll set according to claim 31, wherein the adhesive mask substrate has a release material so as to discourage bonding of said adhesive with said mask substrate.

34. A feed roll set according to claim 30, wherein the magnetized substrate has a release material on an opposite surface thereof.

35. A feed roll set according to claim 16, wherein one of the stock materials is a transparent laminating film and the other stock material is an adhesive transfer substrate comprising a release liner with release material on one surface thereof and adhesive on the opposite surface thereof.

36. A feed roll set according to claim 35, wherein the laminating film also has adhesive on one surface thereof.

37. A feed roll set according to claim 16, wherein each of the cores is substantially tubular and said flanges of each feed roll system are provided on a pair of end caps, each of the end caps having a substantially tubular core securing portion and a mounting portion connected to the core securing portion, said core securing portions being inserted in opposing ends of said cores;

the end caps each further comprising art expansion member, each expansion member being disposed in said core securing portion of a respective end cap to radially expand the core securing portions of the end caps into a force fit relation with the interior surface of the cores to secure the end caps to the cores.

38. A feed roll set according to claim 37, wherein said cores are each constructed of a paper or a cardboard material and wherein each core securing portion is in the form of a cylindrical tube having a split free end, said split free end of each core securing portion defining a plurality of tabs, each tab including gripping structure on the exterior thereof, each expansion member being disposed in each core securing portion to radially expand said tabs such that said gripping structures grip said papa or cardboard materials.

39. A combination comprising:
a master processing apparatus having a frame, a master processing assembly and a feed roll mounting system providing at least two pairs of flange receiving spaces each providing a pair of brake surfaces;
a pair of feed roll assemblies systems each comprising:
a core;
a supply of stock material wound about the core;
a pair of flanges extending radially from opposing ends of the core, the flanges being configured to be received in the flange receiving spaces of a respective pair of flange receiving spaces to rotatably mount the core for unwinding of the stock material;
wherein at least one of the stock materials has adhesive on a surface thereof;
the master processing assembly being constructed and arranged to perform a master processing operation wherein the master processing assembly causes adhesive bonding between the stock materials and a master fed into said master processing assembly,
said flanges being received in said flange receiving spaces such that said brake surfaces frictionally engage opposing sides of said flanges such that when said stock materials are being unwound from said cores, said cores with said flanges thereon rotate relative to said feed roll mounting system so that braking friction is created between said flanges and the brake surfaces.

40. A combination according to claim 39, wherein said apparatus further comprises an actuator constructed and arranged to affect operation of said master processing assembly.

41. A combination according to claim 39, wherein the master processing assembly comprises a pair of cooperating pressure applying structures mounted within the frame, the cooperating structures being constructed and arranged to be positioned adjacent one another in a cooperating pressure applying relationship wherein, when the master is positioned between the cooperating structures with the stock materials on opposing sides thereof and with the adhesive contacting the master, the cooperating structures apply pressure to the master and stock materials as they pass therebetween so as to affect adhesive bonding between said master and the stock materials.

42. A combination according to claim 41, wherein the pair of pressure applying structures comprises a first nip roller and a second nip roller.

43. A combination according to claim 39, wherein each flange receiving space includes a pre-tension brake providing a respective brake surface, wherein the braking friction applied by each pre-tension brake progressively decreases as the stock materials are unwound from the cores.

44. A combination according to claim 43, wherein the braking friction applied by each pre-tension brake progressively decreases as the stock materials are unwound such that the amount of force required to unwind stock material from the cores remains essentially constant as the supplies of stock material are depleted.

45. A combination according to claim 44, wherein each pre-tension brake includes a flexible molded plastic braking structure, each pre-tension brake being constructed and arranged such that when said opposite sides of said flanges are frictionally engaging with said brake surfaces, the braking structures are in a flexed condition so that the pair of brake surfaces apply the braking friction to said flanges, the molded plastic of the braking structure wearing down as the stock materials are unwound from the cores, thereby progressively lessening the flexure of said braking structures such that the amount of braking friction applied to said flanges progressively decreases so that the amount of force required to unwind the stock materials remains essentially constant as the stock materials are depleted as aforesaid.

46. A combination according to claim 39, wherein the feed roll mounting system is removably mounted on the apparatus frame.

47. A combination according to claim 46, wherein the feed roll mounting system is provided on a cartridge body removably mountable to the apparatus frame.

48. A combination according to claim 39, wherein the core of each feed roll system is a substantially tubular structure.

49. A combination according to claim 39, wherein each flange is constructed of a molded plastic material and attached to the core of each feed roll system.

50. A combination according to claim 39, wherein the core of each feed roll system is constructed of a paper or a cardboard.

51. A combination according to claim 39, wherein the core and the flanges of each feed roll system are separately formed and attached to one another.

52. A combination according to claim 39, wherein only one of the stock materials has adhesive on a surface thereof and the other of die stock materials is devoid of adhesive.

53. A combination according to claim 39, wherein an opposite surface of the stock material with adhesive has a release material and the stock material is wound about its core with the adhesive engaging the release material.

54. A combination according to claim 39, wherein both the stock materials have adhesive on a surface thereof.

55. A combination according to claim 54, wherein an opposite surface of each of the stock materials has a release material and the stock materials are wound about the cores with the adhesives engaging the release materials.

56. A combination according to claim 39, wherein one of the stock materials is an adhesive mask substrate and the other stock material is an adhesive transfer substrate comprising a release liner with release material on one surface thereof and adhesive on the opposite surface thereof.

57. A combination according to claim 56, wherein the adhesive mask substrate has an affinity for bonding with said adhesive.

58. A combination according to claim 57, wherein the adhesive mask substrate has a release material so as to discourage bonding of said adhesive with said mask substrate.

59. A combination according to claim 39, wherein both the stock materials are transparent laminating films.

60. A combination according to claim 59, wherein both the laminating films have adhesive on a surface thereof.

61. A combination according to claim 59, wherein only one of the laminating films has adhesive on a surface thereof.

62. A combination according to claim 39, wherein one of the stock materials comprises a magnetized substrate coated with adhesive on one surface thereof and the other stock material is an adhesive mask substrate.

63. A combination according to claim 62, wherein the adhesive mask substrate has an affinity for bonding with said adhesive.

64. A combination according to claim 62, wherein the adhesive mask substrate has a release material so as to discourage bonding of said adhesive with said mask substrate.

65. A combination according to claim 61, wherein the magnetized substrate has a release material on an opposite surface thereof.

66. A combination according to claim 39, wherein one of the stock materials is a transparent laminating film and the other stock material is an adhesive transfer substrate comprising a release liner with release material on one surface thereof and adhesive on the opposite surface thereof.

67. A combination according to claim 66, wherein the laminating film also has adhesive on one surface thereof.

68. A combination according to claim 39, wherein each of the cores is substantially tubular and said flanges of each feed roll system are provided on a pair of end caps, each of the end caps having a substantially tubular core securing portion and a mounting portion connected to the core securing portion, said core securing portions being inserted in opposing ends of said cores;

the end caps each further comprising an expansion member, each expansion member being disposed in said core securing portion of a respective end cap to radially expand the core securing portions of the end caps into a force fit relation with the interior surfaces of the cores to secure the end caps to the cores.

69. A combination according to claim 68, wherein said cores are each constructed of a paper or a cardboard material and wherein each core securing portion is in the form of a cylindrical tube having a split free end, said split free end of each core securing portion defining a plurality of tabs, each tab including gripping structure on the exterior thereof, each expansion member being disposed in each core securing portion to radially expand said tabs such that said gripping structures grip said paper or cardboard materials.

70. A combination according to claim 39, wherein the feed roll mounting system comprises a retainer member for each flange receiving space, said retainer member being movable between (a) retaining positions retaining the flanges in the flange receiving spaces, and (b) releasing position to enable the flanges to be removed from the flange receiving spaces.

71. A combination according to claim 70, wherein the retainer member each include a body portion and a pair of resilient legs, each leg having a lock structure on an end portion thereof, the feed roll mounting system including a pair of openings for receiving the legs, providing locking surfaces with which the lock structures engage to releasably lock the retainer members in the retaining position thereof.

72. A combination according to claim 70, wherein the feed roll mounting system is removably mounted on the apparatus frame.

73. A combination according to claim 72, wherein the feed roll mounting system is provided on a cartridge body removably mountable to the apparatus frame.

74. A method for mounting a pair of feed roll systems to a feed roll mounting system, the feed roll mounting system having two pairs of flange receiving spaces and enabling the feed rolls to be mounted to a master processing apparatus having a frame and a master processing assembly, the master processing assembly being constructed and arranged to perform a master processing operation wherein the processing assembly causes adhesive bonding between stock materials and a master fed therein; each of said feed roll systems having a core, a supply of stock material wound about the core, at least one of the stock materials having adhesive on a surface thereof, and a pair of flanges extending radially from opposing ends of the core, the flanges being configured to be received in the flange receiving recesses spaces of a respective pair of flange receiving spaces to rotatably mount the cores for unwinding of the stock materials, the method comprising:

inserting the flanges of each feed roll system in a respective one of the pairs of flange receiving spaces so as to rotatably mount the cores for unwinding of the stock materials;

wherein the feed roll mounting system is a feed roll mounting structure constructed to be removably mounted to the apparatus frame;

wherein the flanges of each feed roll system are inserted into the respective pairs of flange receiving spaces prior to removably mounting the feed roll mounting structure to the apparatus frame, said flanges being received in said flange receiving spaces such that said brake surfaces frictionally engage opposing sides of said flanges such that when said stock materials are being unwound from said cores, said cores with said flanges thereon rotate relative to said feed roll mounting structure so that braking friction is created between said flanges and the brake surfaces;

the method further comprising removably mounting the feed roll mounting structure to the apparatus frame.

75. A method according to claim 74, wherein the feed roll mounting structure is a cartridge.

76. A method according to claim 74, wherein the feed roll mounting structure comprises a retainer member for each flange receiving space, said retainer member being movable between (a) retaining positions retaining the flanges in the flange receiving spaces, and (b) releasing positions to enable the flanges to be removed from the flange receiving spaces the method further comprising:

after inserting the flanges of each feed roll in a respective pair of flange receiving recesses, moving the retainer members to the retaining position thereof to retain the flanges in the flange receiving spaces.

77. A method according to claim 76, wherein the feed roll mounting structure is a cartridge.

78. A combination comprising:

a master processing apparatus having a frame, a master processing assembly and a feed roll mounting system providing a pair of flange receiving spaces each providing a pair of brake surfaces;

a feed roll system comprising:
 a core;
 a supply of stock material wound about the core;
 a pair of flanges extending radially from opposing ends of the core, the flanges being configured to be received in the flange receiving spaces to rotatably mount the core for unwinding of the stock material;
 wherein the stock material has adhesive on a surface thereof;

the master processing assembly being constructed and arranged to perform a master processing operation wherein the master processing assembly causes adhesive bonding between the stock material and the master fed into the master processing assembly;

said flanges being received in said flange receiving spaces such that said brake surfaces frictionally engages opposing sides of said flanges such that when said stock material is being unwound from said core, said core with said flanges thereon rotates relative to said feed roll mounting system so that braking friction is created between said flanges and the brake surfaces.

79. A combination according to claim 78, wherein the flange receiving spaces provide opposing brake surfaces for applying braking friction to opposing sides of each flange to pre-tension the stock material as the stock material is being unwound from the core.

80. A combination according to claim 79, wherein each flange receiving space includes a pre-tension brake providing a respective brake surface, wherein the braking friction applied by each pre-tension brake progressively decreases as the stock material is unwound from the core.

81. A combination according to claim 80, wherein the braking friction applied by each pre-tension brake progressively decreases as the stock material is unwound such that the amount of force required to unwind the stock material remains essentially constant as the stock material is depleted.

82. A combination according to claim 81, wherein each pre-tension brake includes a flexible molded plastic braking structure, each pre-tension brake being constructed and arranged such that when said opposite sides of said flanges are frictionally engaging with said brake surfaces, the braking structures are in a flexed condition so that the pair of brake surfaces apply the braking friction to said flanges, the molded plastic of the braking structure wearing down as the stock material is unwound from the core, thereby progressively lessening the flexure of said braking structures such that the amount of braking friction applied to said flanges progressively decreases so that the amount of force required to unwind the stock material remains essentially constant as the stock material is depleted as aforesaid.

83. A combination comprising:
 a master processing apparatus having a frame, a master processing assembly and a feed roll mounting system providing a pair of flange receiving spaces;
 a feed roll system comprising:
  a core;
  a supply of stock material wound about the core;
  a pair of flanges extending radially from opposing ends of the core, the flanges being configured to be received in the flange receiving spaces to rotatably mount the core for unwinding of the stock material;
  wherein the stock material has adhesive on a surface thereof;
 the master processing assembly being constructed and arranged to perform a master processing operation wherein the master processing assembly causes adhesive bonding between the stock material and the master fed into the master processing assembly;
 wherein the feed roll mounting system comprises a retainer member for each flange receiving space, said retainer members being movable between (a) retaining positions retaining the flanges in the flange receiving spaces, and (b) releasing positions to enable the flanges to be removed from the flange receiving spaces.

\* \* \* \* \*